Jan. 1, 1957     D. N. EDWARDS     2,775,904
PORTABLE TOOL

Filed Aug. 2, 1954     2 Sheets-Sheet 1

INVENTOR
DAVID N. EDWARDS
BY
Curtis, Morris & Safford
ATTORNEYS

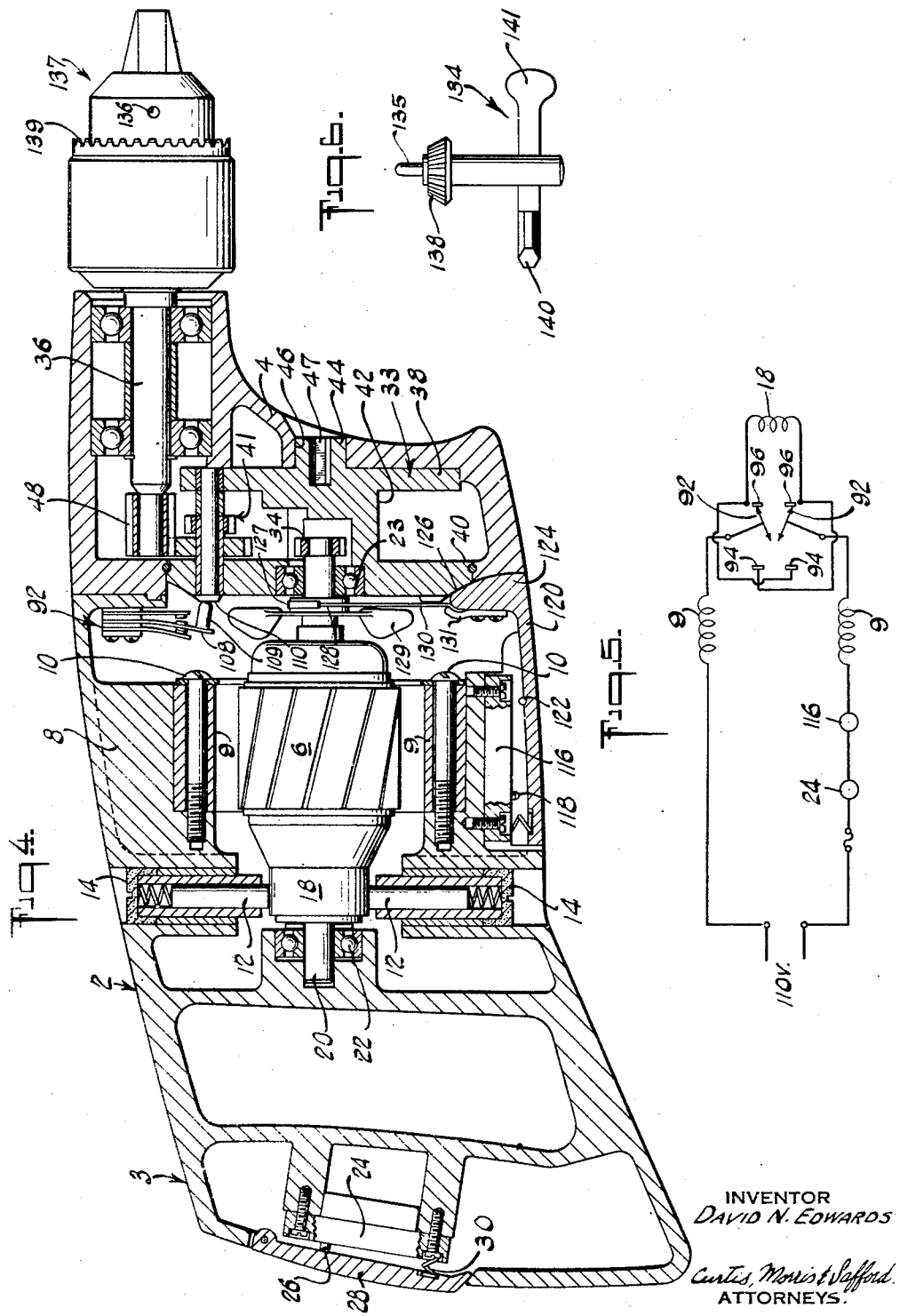

United States Patent Office 2,775,904
Patented Jan. 1, 1957

2,775,904
PORTABLE TOOL
David N. Edwards, Greenwich, Conn.
Application August 2, 1954, Serial No. 447,059
17 Claims. (Cl. 74—472)

This invention relates to variable speed transmissions. More particularly, the invention relates to a variable speed transmission of such compact and rugged construction that it may be incorporated in a portable power-driven tool to permit operation of the tool at different speeds, each suited to the nature or character of the work which it is doing. The invention also relates to portable electric drills.

It is well known in the use of drills that there exists for every material with each particular drill bit there is an optimum surface cutting speed and for each electric drill there is a limit to the load which can be safely applied. Power drills, having incorporated therein a variable speed transmission of my invention, may be used to advantage in situations requiring either frequent change of drill size or frequent change of material being worked on or both.

Among the advantages of multi-speed portable power drills of this invention over fixed-speed drills are: reduction or elimination of drill breakage; substantial elimination of drill burning due to excessive speeds; substantial elimination of "chatter" due to low speeds; cleaner cutting; closer dimensional accuracy; quicker drilling; wider range of drills and attachments useable with a given power drill without over-loading its motor.

One object of this invention is to effect quick changes in gear ratio of drive both quickly and easily.

The present invention aims particularly to provide an electric hand drill having incorporated therein a variable speed transmission which, while it permits easy, quick and safe adjustment to each of a considerable range of drill speeds, is of such simple, compact and rugged construction that it adds relatively little either to the weight or to the bulk of the drill structure.

An important feature of the invention, which contributes to obtaining a wide range of speeds with a compact transmission, is the provision of means for reversing the driving motor for each successive speed adjustment, in combination with a transmission made up of continuously intermeshing gear clusters, each engageable selectively with an output gear, whereby rotation of the output gear may be always in the same direction.

Another important feature of the invention is the provision of means to prevent operation of the driving motor while speed adjustments are being made, such means being also associated with means for locking the transmission in each of its speed adjustments before power can be applied thereto.

Another feature of the invention which contributes to its compactness is the arrangement of the intermeshed gear clusters of the transmission in a frame (e. g. the housing) rotatable about the axis of the input drive shaft, with one gear of each cluster having its pitch circle tangent to a circle centered on said axis and tangent also to an intermediate gear movable in an annular orbit around a "sun" gear on said drive shaft, so that it can, while engaging the sun gear, be engaged successively with each of the gear clusters. Another feature of the invention being the utilization of this rotary speed adjusting movement of the transmission frame or housing to operate a motor reversing switch, such, for example, as a double pole, double throw switch, to change the direction of rotation of the driving motor as the transmission is turned from each speed adjustment to the next.

Other important features, objects and advantages of the invention, to which reference has not been made hereinabove, will appear hereinafter when the following description and claims are considered in connection with the accompanying drawings, in which:

Figure 1 is a plan view, partly in section, of a variable speed transmission made up of directly intergeared gear clusters so compactly arranged about a driving or input gear and so adjustable thereabout that they may be brought successively into mesh with an output gear, whereby the transmission can easily be incorporated in a power-driven hand tool to provide a plurality of different speed adjustments, eight as shown in this figure;

Figure 4 is a longitudinal section through an electrically driven hand drill having the variable speed transmission of Figure 1 incorporated therein, but with its gearset rotated to bring its No. V gear into mesh with the chuck shaft gear;

Figure 5 is a wiring diagram of the reversing circuit;

Figure 6 is a side view of a chuck key with the handle hexed at a bent over end to serve as an Allen wrench for the gear change.

Figure 1:
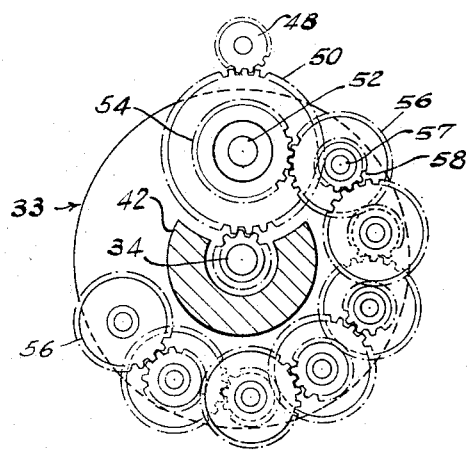
Figure 3:
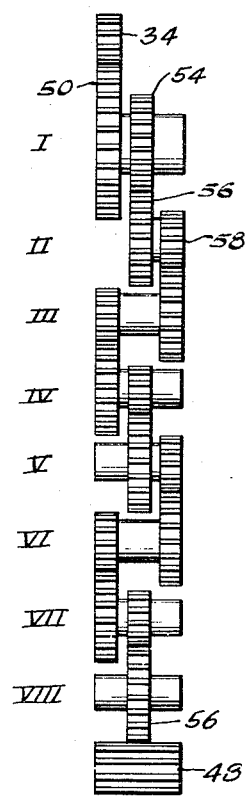
Figure 3 is a diagrammatic view of the gear train shown to scale, but extended on a straight line.
Figure 2:
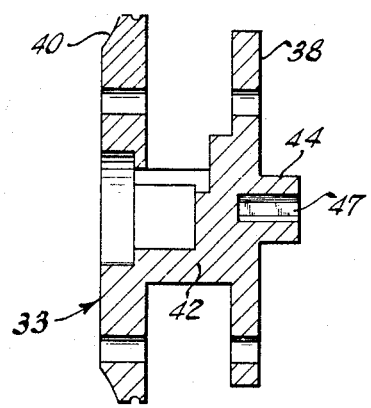
Figure 2 is a section on the line 2—2 of Figure 1 showing the structure of the gear carriage with the transmission gears removed.

In the electric drill chosen as embodiment to illustrate the invention herein, the housing, which serves also as the frame, is preferably made in two main parts for convenience in assembling, namely, a motor housing part 2 (Figure 4) having the hand hold 3 which carries the motor controlling switch 24 and a gear housing part 4 in which the change speed reduction gear and the chuck shaft are mounted.

As herein shown the motor 6 has ribs 8 machined to form positioning faces on which field coils of the motor are held by screws 10. Commutator brushes 12 are located in sockets 14. The armature 18 is carried on shaft 20 mounted in ball bearings 22 and 23.

Actuation of the motor 6 is effected by pressure on the hand hold 3 and in particular upon a switch 24 therein, normally spring biased to its open position and having a pin 26 operated by lever 28 located in the end of the hand grip 3. Thus, when the operator squeezes the hand hold 3 the lever 28 is pressed down to actuate switch 26, and when he relaxes his grip the lever 28 springs up and the switch opens. A spring 30 normally presses the lever 28 to its outer limit of movement, i. e., to its open switch position.

The ball bearing 23 is mounted in a socket in the change speed gear carriage 33 which, in turn, is located in the part 4 of the housing. The shaft 20 beyond the bearing 23 carries a gear 34 which serves as the central power input gear in a change speed gearset. The chuck shaft 36, the reduction gears and the housing are so constructed and arranged with respect to the input gear 34 that shifting of the change speed gear system concentrically about the axis of gear 34 brings the driving gears successively into driving relation to the chuck shaft 36, as will appear more fully hereinafter. The input gear, whether central or peripheral to the carriage 33, and the output gear, whether central or peripheral, are referred to as "terminal" gears.

It will be seen that the gear carriage 33 comprises two spaced flanges 38 and 40 in which the gear clusters 41 are rotatably mounted. These disks are integrally interconnected by a hub 42 which partially surrounds the drive gear 34, but leaves one side exposed for engagement with the gear clusters 41. The frame housing 4 is recessed as shown to fit the carriage 33, with the forward flange 38 and the slightly larger flange 40 each fitting against corresponding faces in the housing 4. A boss 44 centrally positioned on forward flange 38 is fitted in bearing 46 in the part 4. A hex socket 47 in boss 44 is accessible from the outside for rotating carriage 33 about the gear 34 to shift gears.

Referring particularly to Figure 1 of the drawings, it will be seen that the change speed transmission shown provides for eight different speed ratios when the gear clusters are brought successively into mesh with the chuck shaft gear 48. As shown in Figure 1, the gearset is positioned for the highest speed on the chuck shaft 36, this being, in the illustrative embodiment, the speed of the shaft 20 since the input and output gears 34 and 48 are of the same diameter and are connected by a gear 50, which is of a diameter sufficient to mesh with both gear 34 and gear 48 when the gearset is in the position shown in Figure 1.

The gear 50 is constantly in mesh with drive gear 34, but may be moved into and out of mesh with the drive gear 48 when the gearset is rotated. The gear 50 constitutes part of one of a gear cluster stub shaft 52 mounted in flanges 38 and 40. The other gear 54 of this first gear cluster (hereafter referred to as "cluster I") is formed integral with gear 50, but of a smaller diameter, and is arranged to mesh constantly with a gear 56 of cluster II.

Gear 56, mounted upon shaft 57 fixed at its ends, like shaft 52, in the flanges 38 and 40, is of such diameter and so located on the carriage 33 that when the gearset is rotated about the axis of the shaft 20 to move gear 50 out of mesh with output gear 48, gear 56 may be moved into mesh with gear 48. Gear 50, as it remains constantly in mesh with input gear 34, then serves as an intermediate gear of the drive train.

The gear train here illustrated provides for eight different drill speeds by eight gear clusters mounted in a circle concentric with shaft 20, and each on a stub shaft 57. Cluster VIII may comprise only a single gear without the smaller gear 58, since it is at the end of the gear train and therefore does not have to drive another cluster.

As herein shown each gear cluster except I and VIII comprises a gear 56 adapted to mesh with output gear 48 in one position of the gearset, and a second gear 58 of smaller diameter, coaxial with and preferably integral with the larger gear, the smaller gear being in mesh with the large gear of the next cluster.

Each gear cluster is mounted on a shaft 57 mounted in the flanges 38 and 40 of the transmission housing 33. Flanges 38 and 40 fit into housing 4 and bearing 23 is of the oil type so that the space between flanges 38 and 40 and around shaft 36 can be packed with lubricant. Or the gear clusters may each be of a low friction material such, for example, as nylon.

Referring now to Figures 4 and 5, it will be seen that the series wound motor 6 has its armature 18 connected to its field coils 9 through a double pole, double throw reversing switch 92, so that, when the switch 92 is swung to its right hand position in Figure 5, it provides for a series flow of the current through the field and the armature by connecting the arms of switch 92 with the contacts 94 on one side or with the contacts 96 on the other side. Reversing the direction of flow of the current through the armature 18 without changing its direction through the field coils 9 will obviously reverse the direction of rotation of the motor 6.

The reversing switch 92 may be of any usual D. P. D. T. construction and is of compact design adapted to operate in the relatively restricted space provided for it. This is best illustrated in Figures 4 and 5, the D. P. D. T. switch 92 being mounted on housing 2 behind the end of shaft 36. This may comprise two contacts 92 at one side and two contacts 94 at the other side insulated from each other and from the center contacts 92 and spring-biased, as shown in Figure 4, so that it swings to its right hand position. This switch arm 92, as shown, has a downward extension 108, as shown in Figure 4, which carries a rounded cam engaging knob 109, advantageously of molded nylon, adapted to engage successively cam projections 110 spaced on the upper face of the flange 40 so that the cam 110 engages knob 109 and moves the switch arm 92 to the left to reverse the motor 6 when alternate gear clusters 56 are positioned, respectively, to mesh with gear 48.

It will be understood that the operation of the motor reversing switch 92 in proper timed relation to the adjustment of the variable speed transmission can be effected in other ways, as, for example, by moving the switch arm 92 positively in both directions. This could be effected by providing a suitably shaped cam groove on the upper face of the disk 40 in which a cam follower on the switch arm travels.

As shown in Figures 4 and 5, provision is made for preventing speed changing gear shift when the motor 6 is running and also for insuring a complete adjustment of the transmission and its locking in its adjusted position before the motor can again be started. A normally closed switch 116 in the power circuit, e. g., a microswitch actuated by a pin 118 engaged by one arm of a first class lever 120 fulcrumed at 122 and adapted to be pushed inward by the hand of an operator about to make a speed varying adjustment. The other arm of the lever 120 carries a latch projection 124 adapted to engage one of a series of positioning and locking notches 126 in the corner of disk 40. These notches 126 are so located that each corresponds to one speed adjustment, so that when the latch 124 is engaged in a notch 126 the gears are accurately located to properly intermesh and flange 40 is locked firmly in that position. A spring 128 is so located as to tend to hold the latch 124 in the selected notch 126 and the parts are so proportioned that the lever 120 must be depressed far enough to open the switch 116 in the power circuit before the latch 124 is withdrawn far enough from the notch 126 to permit a turning movement of the disk 40 of the transmission housing 33.

Advantageously the lever 120 also operates a brake to stop rotation of the gears before shifting. This may be as shown a pivoted brake shoe 127 adjacent brake drum 128 to which cooling fan 129 is secured. This shoe is actuated by a tensile strap 130 secured to projection 124 by clamp 131.

As stated above, it is well understood in machine shop practice that there is an optimum cutting speed for each job depending upon the form and position of the cutting tool and its material and the nature of the material being cut. In drills and lathes, where cutting is at the circumference of a rotating piece (work or tool), the optimum speed of rotation must also depend upon the radius of the piece, as it is the surface speed which is important. All this has been taken into account in geared lathes and drill presses, but it has always been assumed that a portable drill has to make the best of a compromise speed to which the drill shaft is geared in its original design. The present invention changes this by providing such a compact change speed device, so economically built into a standard drill design, that neither the bulk nor the weight is seriously objectionable, but is well justified by the greater value of the drill and its ability to do well different jobs.

In the use of this drill as shown in the drawings, one first selects the tool and determines from standard tables or by known calculations the speed of rotation designed for the particular job. The tool is installed in the chuck and the chuck tightened by wrench 134, fitting its pin 135 into hole 136 on the chuck 137 and meshing its bevel gear 138 with the gear 139 cut in the outer sleeve 139 of the chuck. The wrench is then removed and the bent over hexagonal end 140 of its L-shaped handle 141 is fitted into the hex socket 47 and, while 120 is pushed down to release latch 124, it is used as an Allen wrench to rotate the change speed gear carriage 33 to bring the selected gear 50 or 56 into mesh with chuck shaft gear 48.

In the normal operation all this will be done while the motor and gears are at rest; but if one should accidently attempt to shift gears while the motor is rotating, the carriage 33 could not be moved until the lever 120 is depressed to release latch 124, and when that is done it cuts off the motor at switch 116 and applies the brake 127 on the drum 128 to stop its rotation.

From the foregoing description it will be seen that the present invention provides a simple, easily operated and substantially fool-proof variable speed transmission that, as herein shown, may be incorporated in a portable power-driven tool, such as the illustrated electric hand drill, to permit its operation at speeds best suited to work being done.

What is claimed as new is:

1. In a change speed transmission the combination with terminal gears comprising an input gear and an output gear, of a gear train for connecting said input and output gears made up of a series of interengaged driving gears having drive ratios such that successive driving gears turn at different speeds, each driving gear being movable with said train into mesh with one of said terminal gears, all of said driving gears of said train being in constant engagement with the other terminal gear, a support for said gear train movable to bring the driving gears successively into driving relation to said one terminal gear, a motor for turning said input gear, and motor-reversing means actuated by the gear-shifting movement of said gear train support to reverse the direction of rotation of said input gear as the gear train is moved from one power-transmitting position to the next.

2. A change speed transmission as defined in claim 1 in which an interlock is provided between the gear train support and the motor, said interlock comprising support-locking means and a switch so interconnected that, before a change in the drive ratio can be effected by moving from one power-transmitting position to the next, a normally closed switch must be opened to cut off the power supply to the motor.

3. A change speed transmission as defined in claim 1 in which one of the terminal gears is arranged centrally in the transmission and the other terminal gear is arranged peripherally of the transmission the driving gears of said train are arranged in a series with their pitch circles, respectively, internally tangent to a circle centered on the axis of the central terminal gear, and are rotatably mounted on a carriage rotatable about said axis, and the peripheral terminal gear is positioned to mesh successively with said driving gears as said carriage is rotated.

4. A portable tool having incorporated therein the change speed transmission defined in claim 3, said tool having a body portion in which the axes of rotation of the central terminal gear and the peripheral gear are fixed in respect to each other and in which the central terminal gear is the input gear and the peripheral gear is the output gear, and the carriage is rotatably shiftable about the input gear axis into successive gear ratio transmitting relations to the output gear.

5. A portable tool according to claim 4 in which the gear carriage is rotatable about the axis of the input gear and the motor-reversing means comprise a reversing switch on the tool body, and switch operating means locked into said rotatable gear carriage and adapted to effect actuation of the switch to reverse the motor as the gear carriage moves from one gear ratio location to the next.

6. In a portable motor-driven tool having a mechanism-supporting body, the combination with a motor-driven shaft having a drive gear thereon and a tool shaft having thereon a driven gear, of a change speed transmission between said gears comprising a train of directly interconnected gear clusters, each cluster having a plurality of gears, one a gear of each cluster being selectively movable into mesh with said tool shaft gear when said train is moved about the axis of said driving gear and being directly meshed with a gear in the adjacent cluster in one direction in the train, another gear of each cluster being directly meshed with a gear in the adjacent cluster in the other direction in the train, and one of said gears in one of said gear clusters being constantly in mesh with said drive gear.

7. A combination as defined in claim 6 in which a gear carriage carrying said train is rotatable about the axis of the driving gear to effect the speed change connections and in which a motor-reversing switch is mounted on the frame of the tool, cooperating means located adjacent said carriage and said switch for locking the carriage and operating said switch to reverse the rotation of said motor for each successive speed adjustment when the carriage is unlocked to permit rotation.

8. A portable tool having incorporated therein the variable speed transmission defined in claim 3 and in which the gear carriage includes a part readily accessible from the outside of said tool for manually rotating said carriage about the axis of the central terminal gear.

9. An electric hand tool having incorporated therein the variable speed transmission defined in claim 3 and having a latch for positively holding the gear carriage in any of its positions of speed adjustment, a normally closed switch in the motor circuit and means for moving said latch into carriage releasing position, including means operating to open said motor circuit switch as a prerequisite of the completion of the unlatching operation.

10. In a portable motor-driven tool the combination of a hollow body for enclosing and supporting the drive mechanism, an electric motor comprising a stator secured in said body and a rotor mounted in bearings in said body but having a space therebeyond in the front end of the body, an input gear on said rotor projecting into said space, a rotary gear carriage in said space mounted on bearings coaxial with said input gear and having a hub provided with wrenching surfaces exposed to the exterior of said body for engagement to rotate said carriage, a gear train on said carriage comprising a series of driving gears interengaged with gear ratios such that successive driving gears turn at different speeds, all of said driving gears being internally tangent to a circle smaller than said end space and concentric with the bearings of said carriage, an output shaft extending through the end of said body, having an output gear secured thereon and positioned so that said output gear has its dedendum circle externally tangent to the same circle to which said driving gears are internally tangent.

11. In a portable motor-driven tool having a mechanism-supporting body, a change speed transmission comprising a first terminal gear, a train of directly intermeshed gear clusters arranged generally about said first terminal gear, each cluster having a plurality of gears including a driving gear, the driving gears of said train all having their pitch circles, respectively, internally tangent to a circle centered on the axis of said first terminal gear, one of said driving gears being of sufficiently large diameter directly to engage said first terminal gear, the other driving gears directly engaging gears in the respective adjacent clusters, and a second terminal gear having its pitch circle tangent to said circle centered on the axis of the first terminal gear and being selectively engageable with each of said driving gears, whereby when said second terminal gear engages said one driving gear of large diameter said first and second terminal gears rotate at the same tooth speed.

12. In a portable motor-driven tool having a mechanism-supporting body, a change speed drive system comprising a first terminal gear, a plurality of intermeshed gear clusters arranged in a train generally curved around said first terminal gear, each cluster having a driving gear and a smaller gear directly connected to the driving gear and coaxial therewith, said smaller gears in each cluster each meshing with the driving gear in the next successive cluster in the train, whereby the driving gears in successive clusters turn in opposite respective directions, said driving gears all having their pitch circles, respectively, internally tangent to a circle centered on the axis of said first terminal gear, one of said driving gears being of larger diameter than the other driving gears in the train and directly meshing with said first terminal gear, said smaller gears all lying entirely within said centered circle, a second terminal gear having its pitch circle externally tangent to said centered circle and being selectively engageable with each of said driving gears, locking means for positively locking said second terminal gear in engagement with each of said driving gears, a reversible motor connected to one of said terminal gears, a motor-reversing switch means actuated by the selective engagement of said second terminal gear to provide a reverse in the direction of rotation of the motor when said second terminal gear is disengaged from a driving gear and engaged with the next successive driving gear.

13. A portable motor-driven tool having a mechanism supporting body, a change speed transmission comprising a first terminal gear, a train of intermeshed gear clusters, each cluster having a driving gear and a second gear connected thereto, the driving gears of said train having their pitch circles, respectively, internally tangent to a circle centered on the axis of said first terminal gear, each driving gear engaging a second gear in the respective adjacent cluster, one of said driving gears directly engaging said first terminal gear, and a second terminal gear having its pitch circle tangent to said circle centered on the axis of said first terminal gear and being selectively engageable with each of said driving gears, and a reversible motor on said body connected to one of said terminal gears.

14. A portable tool having a mechanism supporting body, a change speed transmission comprising a first central terminal gear, a gear carriage, a train of directly interconnected gear clusters, arranged generally annularly around said central terminal gear and supported on said gear carriage, each cluster having a plurality of gears including a driving gear, the driving gears of said train having their pitch circles, respectively, internally tangent to a circle centered on the axis of said first terminal gear, one of said driving gears directly engaging said first terminal gear, the other driving gears directly engaging gears in the respective adjacent clusters, and a second terminal gear having its pitch circle tangent to said circle centered on the axis of the first terminal gear, said gear carriage being rotatable about said axis selectively to engage said driving gears with said second terminal gear, said gear carriage being readily actuable from the outside of said tool for manually rotating said carriage about the axis of said central terminal gear.

15. A tool as claimed in claim 14 and wherein said gear carriage is a turret with spaced flanges, said gear clusters in said train being positioned between said flanges with portions of all of the driving gears being accessible beyond the periphery of said flanges.

16. A tool as claimed in claim 15 including a gear housing and a motor housing adjacent thereto, said turret being located within said gear housing, at least one of said turret flanges being circular and concentric about said axis, all of the gears in each cluster being integrally connected together, stub shafts rotatably supporting said gear clusters between said flanges, said stub shafts being fixed in both of said turret flanges and extending therebetween, said one turret flange providing a lubrication seal between said gear housing and motor housing.

17. A tool as claimed in claim 14 including a hub on the gear carriage which is accessible from outside the tool body, said hub having wrenching surfaces to facilitate turning said gear carriage.

References Cited in the file of this patent

UNITED STATES PATENTS

| | | |
|---|---|---|
| 812,888 | Shannon | Feb. 20, 1906 |
| 2,385,630 | Lear | Sept. 25, 1945 |
| 2,392,097 | Meunier | Jan. 1, 1946 |
| 2,392,193 | Schneider | Jan. 1, 1946 |